US010318313B2

(12) United States Patent
Sol (10) Patent No.: US 10,318,313 B2
(45) Date of Patent: Jun. 11, 2019

(54) APPARATUS AND METHOD FOR CONTROLLING SYSTEM POWER IN VEHICLE (71) Applicant: HYUNDAI MOTOR COMPANY, Seoul (KR)

(72) Inventor: Un Hwan Sol, Yongin-si (KR)

(73) Assignee: Hyundai Moto Company, Seoul (KR)

( * ) Notice: Subject to any disclaimer, the term of this patent is extended or adjusted under 35 U.S.C. 154(b) by 55 days.

(21) Appl. No.: 15/066,079

(22) Filed: Mar. 10, 2016

(65) Prior Publication Data
US 2017/0083345 A1 Mar. 23, 2017

(30) Foreign Application Priority Data
Sep. 21, 2015 (KR) .................. 10-2015-0133197

(51) Int. Cl.
G06F 9/44 (2018.01)
G06F 21/57 (2013.01)
G06F 9/4401 (2018.01)
H04L 29/08 (2006.01)
H04W 4/80 (2018.01)
G06F 21/35 (2013.01)
H04L 29/06 (2006.01)
H04W 12/08 (2009.01)

(52) U.S. Cl.
CPC ............ *G06F 9/4416* (2013.01); *G06F 21/35* (2013.01); *H04L 63/0853* (2013.01); *H04L 67/12* (2013.01); *H04W 4/80* (2018.02); *H04W 12/08* (2013.01); *H04L 63/107* (2013.01)

(58) Field of Classification Search
CPC ...... G06F 21/575; G06F 9/4416; G06F 21/35; H04L 67/12; H04L 63/0853; H04L 63/107; H04W 4/008; H04W 12/08; H04W 4/80
See application file for complete search history.

(56) References Cited

U.S. PATENT DOCUMENTS

| 6,600,430 B2 * | 7/2003 | Minagawa ......... G08B 13/1427 340/539.11 |
| 8,600,431 B2 * | 12/2013 | Otsuka ................... H04W 8/22 455/418 |
| 9,110,772 B2 * | 8/2015 | Huntzicker ............. B60R 25/24 |
| 2007/0171040 A1 | 7/2007 | Li |

(Continued)

FOREIGN PATENT DOCUMENTS

JP 2001-218262 8/2001
JP 2006-287321 A 10/2006
(Continued)

OTHER PUBLICATIONS

Office Action for Korean Patent Application No. 10-2015-0133197, dated Jun. 7, 2016, 8 pgs.

*Primary Examiner* — Fahmida Rahman
(74) *Attorney, Agent, or Firm* — Brinks Gilson & Lione (57) ABSTRACT A method and an apparatus are provided for controlling a power supplied to an in-vehicle computing device. In the method, a mobile device is discovered, which is capable of communicating via a local area network. After it is determined whether a discovered mobile device is registered, the in-vehicle computing device is pre-booted according to a first condition when the discovered mobile device is registered.

10 Claims, 7 Drawing Sheets (56) References Cited

U.S. PATENT DOCUMENTS

2014/0129054 A1* 5/2014 Huntzicker ............ G06F 17/00
    701/2
2014/0274013 A1    9/2014 Santavicca
2014/0327517 A1  11/2014 Portet
2017/0249792 A1* 8/2017 Gennermann ..... G07C 9/00142

FOREIGN PATENT DOCUMENTS

| | | |
|---|---|---|
| JP | 2013-123096 | 6/2013 |
| JP | 2015-059398 | 3/2015 |
| KR | 10-2010-0040554 A | 4/2010 |
| KR | 10-2010-0040768 | 4/2010 |
| KR | 10-1177660 | 8/2012 |
| KR | 10-2015-0067971 | 6/2015 |

* cited by examiner

APPARATUS AND METHOD FOR CONTROLLING SYSTEM POWER IN VEHICLE

CROSS-REFERENCE TO RELATED APPLICATION

This application claims the benefit of Korean Patent Application No. 10-2015-0133197, filed on Sep. 21, 2015, the disclosure of which is hereby incorporated by reference as if fully set forth herein.

TECHNICAL FIELD

The disclosure relates to an apparatus and a method for controlling a power supplied into an electronic system in vehicle, and more particularly to a device and a method, adapted in a vehicle, for supplying a power into the electronic system based on driver's location in order to provide information which is necessary for driving operation without delay after the driver gets in the vehicle.

BACKGROUND

The statements in this section merely provide background information related to the present disclosure and may not constitute prior art.

Plural electronic devices included in a vehicle can provide, to a driver, information which is of use to driver's operation. However, in contrast to mechanical devices, the electronic devices can spend a predetermined time on preparation for providing information requested by a driver (or user) after a power is supplied to the electronic device by the driver. Particularly, the electronic devices included in the vehicle generally contain an operating system (OS), so a booting time for loading and running the operating system is required.

In order to overcome driver's inconvenience caused by a booting time of electronic device included in the vehicle, a pre-booting has been suggested. The pre-booting can help a driver to use or manipulate useful electronic devices, such as a rear view camera, or etc., without delay.

For example, to run a color screen in a vehicle having a color screen capable of showing an image captured or filmed by the rear view, a multimedia device in the vehicle can recognize that a driver is on board, when there are signals for door unlock, door open, and so on. Then, the multimedia device can pre-boot an operating system included in the vehicle in order to initialize the system and prepare for showing a video signal generated from the rear view camera.

In a case when the pre-booting is preceded based on control signals for door unlock, door open or close, or etc., an in-vehicle system may not be prepared to show a video signal generated from the rear view camera if a time for a driver to get in the vehicle and shift into reverse is shorter than an expected or predetermined time. Accordingly, there can be a time delay for the driver to obtain video information collected by the rear view camera while the driver reversely drives the vehicle.

Further, a multimedia system included in the vehicle can maintain a sleep mode for a predetermined time after the driver switches off the ignition, and then the vehicle could be turned off after the predetermined time. However, in order to decrease power consumption during an idle state such as the sleep mode, it is required to reduce the time from beginning the sleep mode to turning off the vehicle.

SUMMARY

An apparatus and a method engaged with driver's mobile device are for determining a distance between the driver and a vehicle and pre-booting a computing device such as a multimedia system included in the vehicle according to a predetermined condition.

A method and an apparatus for using a local area communication module such as a Bluetooth low energy (BLE) to thereby recognize a user's or driver's location within an approximately 50 meters radius can pre-boot, or turn off, an in-vehicle system based on conditions of distance and time.

A method is provided for controlling a power supplied to an in-vehicle computing device of a vehicle. The method can include the steps of discovering a mobile device which is capable of data communication via a local area network, and checking whether a discovered mobile device is registered. When the discovered mobile device is registered, the in-vehicle computing device can be pre-booted according to a first condition. The first condition can include that the discovered mobile device stays within a predetermined range from the vehicle for a predetermined time.

The local area network can be based on at least one of a Bluetooth, a Bluetooth Low Energy, a ZigBee, an Ultra-Wide Band (UWB), and a millimeter wave (mmWave).

After an ignition is turned off, it can be checked whether the discovered mobile device satisfies a second condition. If the second condition is met, the in-vehicle computing device can be turned off completely. The second condition includes that the discovered mobile device is out of a predetermined range from the vehicle for a predetermined time.

The step of pre-booting the in-vehicle computing device can include a step of checking whether the discovered mobile device satisfies the first condition. If the first condition is met, the in-vehicle computing device can be pre-booted.

The step of pre-booting the in-vehicle computing device can include a step of transmitting distance information to the discovered mobile device. The in-vehicle computing device can be pre-booted when an authorization corresponding to the first condition is received.

The step of pre-booting the in-vehicle computing device can include a step of checking whether the discovered mobile device satisfies the first condition. If the first condition is met, a request signal for vehicle control can be delivered to at least one of the discovered mobile device and a management network server. The in-vehicle computing device can be pre-booted in response to an authorization signal corresponding to the request signal.

An apparatus can be provided in order to control a power supplied to an in-vehicle computing device. The apparatus can include a discovering unit configured to discover a mobile device which is capable of data communication via a local area network. The confirmation unit can check whether a discovered mobile device is registered. When the discovered mobile device is registered, a controller can pre-boot the in-vehicle computing device in response to a first condition.

The first condition can include that the discovered mobile device stays within a predetermined range from the vehicle for a predetermined time.

The local area network can be established based on at least one of a Bluetooth, a Bluetooth Low Energy, a ZigBee, an Ultra-Wide Band (UWB), and a millimeter wave (mm-Wave).

The confirmation unit checks whether the discovered mobile device satisfies a second condition after an ignition is turned off. If the second condition is met, the controller can turn off the in-vehicle computing device. The second condition can include that the discovered mobile device is out of a predetermined range for a predetermined time.

The confirmation unit can check whether the discovered mobile device satisfies the first condition. If the first condition is met, the controller can pre-boot the in-vehicle computing device.

The apparatus can further include a transceiver configured to transmit an authorization request to the discovered mobile device, and to receive an authorization signal corresponding to the first condition. The controller can pre-boot the in-vehicle computing device if the authorization signal corresponding to the first condition is delivered via the transceiver.

The apparatus can further include a transceiver configured to transmit a request signal for vehicle control into at least one of the discovered mobile device and a network server, and to receive an authorization signal corresponding to the request signal. The confirmation unit can check whether the discovered mobile device satisfies the first condition. If the first condition is met, the controller can transmit the request signal via the transceiver. In response to the authorization signal delivered from at least one of the discovered mobile device and the network server, the controller can pre-boot the in-vehicle computing device.

An apparatus can be provided for remotely controlling a power supplied to an in-vehicle computing device engaged with a mobile device comprising a processing system that comprises at least one data processor and at least one computer-readable memory storing a computer program. The processing system can be configured to cause the apparatus to activate an application in response to delivered information of informing that the apparatus is discovered by a vehicle, to receive distance information and/or pre-booting condition from the vehicle, and to monitor whether the pre-booting condition is met. If the pre-booting condition is met, an authorization signal can be transmitted.

The processing system can be configured to cause the apparatus to confirm a given input before the authorization signal is transmitted.

The pre-booting condition can include that the apparatus stays within a predetermined range from the vehicle during a predetermined time.

At least one of the distance information and the pre-booting condition is delivered through a local area network based on at least one of a Bluetooth, a Bluetooth Low Energy, a ZigBee, an Ultra-Wide Band (UWB), and a millimeter wave (mmWave).

Advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

BRIEF DESCRIPTION OF THE DRAWINGS

The accompanying drawings, which are included to provide a further understanding of the disclosure and are incorporated in and constitute a part of this application, illustrate form(s) of the disclosure and together with the description serve to explain the principle of the disclosure. In the drawings.

DETAILED DESCRIPTION

Reference will now be made in detail to the preferred forms of the disclosure, examples of which are illustrated in the accompanying drawings. In the drawings, the same elements are denoted by the same reference numerals, and a repeated explanation thereof will not be given. The suffixes "module" and "unit" of elements herein are used for convenience of description and thus can be used interchangeably and do not have any distinguishable meanings or functions.

The terms "a" or "an", as used herein, are defined as one or more than one. The term "another", as used herein, is defined as at least a second or more. The terms "including" and/or "having" as used herein, are defined as comprising (i.e. open transition). The term "coupled" or "operatively coupled" as used herein, is defined as connected, although not necessarily directly, and not necessarily mechanically.

In the description of the disclosure, certain detailed explanations of related art are omitted when it is deemed that they may unnecessarily obscure the essence of the disclosure. The features of the disclosure will be more clearly understood from the accompanying drawings and should not be limited by the accompanying drawings. It is to be appreciated that all changes, equivalents, and substitutes that do not depart from the spirit and technical scope of the disclosure are encompassed in the disclosure.

Figure 1:
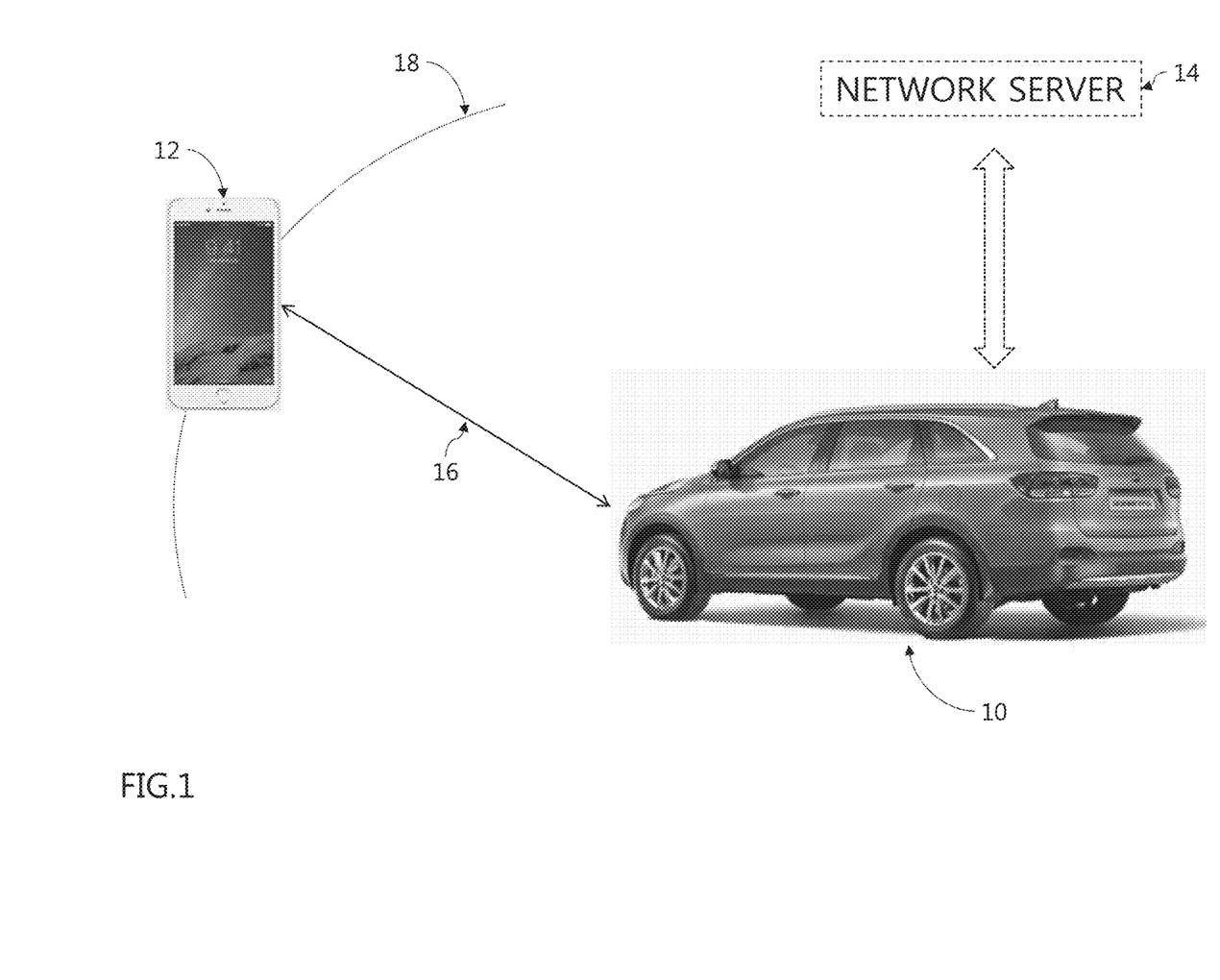
FIG. 1 shows a system for controlling a power supplied to electronic devices included in a vehicle.

FIG. 1 shows a system for controlling a power supplied to electronic devices included in a vehicle.

As shown, the vehicle 10 can recognize driver's location, e.g., a distance 16 between the vehicle 10 and a driver, throughout a mobile device 12 which is possessed by the driver. When the mobile device 12 approaches to the vehicle 10 within a predetermined adjacent area 18 which can be determined by the distance 16, the vehicle can discover that the driver is approaching. In order to pre-boot plural electronic devices included in the vehicle before the driver getting in the vehicle starts to have a drive, the vehicle 10 can monitor the mobile device 12. When the driver's mobile device 12 stays for a predetermined time within the predetermined adjacent area 18, the vehicle can pre-boot the electronic devices. Further, in a process of pre-booting the electronic devices, the vehicle 10 can communicate with a network server 14 through a wireless communication network.

A local area network used by the vehicle 10 for recognizing the location of the mobile device 12 can be based on at least one of a Bluetooth, a Bluetooth Low Energy, a ZigBee, an Ultra-Wide Band (UWB), a millimeter wave (mmWave), and the like. Further, the vehicle 10 can use a WiFi. However, similar to a near field communication (NFC), a wireless communication technology for a proximity distance lesser than 10 centimeter can be barely suitable for the vehicle 10 to recognize the location of the mobile device 12.

For example, when the vehicle 10 uses a Bluetooth Low Energy, the vehicle 10 can estimate a distance between the vehicle 10 and the mobile device 12 based on strength of signal delivered from the mobile device 12.

In order that the vehicle 10 pre-boots the electronic device, the mobile device 12 discovered by the vehicle 10 should be stayed within a predetermined range for a predetermined time. By the way of example but not limitation, if the mobile device 12 is within a 20 to 30 meter radius for 5 to 15 seconds, the vehicle 10 can understand that the driver gets in the vehicle 10 sooner and pre-boot the electronic device.

Further, when the driver keeps apart from the vehicle 10 after the driver turns off an ignition, the electronic device included in the vehicle 10 can be turned off. If the driver turns off an ignition, the electronic device included in the vehicle 10 is not turned off completely but converted into a sleep mode (or a power saving mode). Herein, the sleep mode can include that the electronic device keeps a low power mode while not used or run. Conversion from the sleep mode into a turned-off state can be occurred when the mobile device possessed by the driver is out of a predetermined range for a predetermined time. By the way of example but not limitation, when the mobile device 12 is out of 20 to 30 meter radius from the vehicle 10 and does not re-enter within 20 to 30 meter radius over 5 to 15 seconds, the vehicle 10 can understand that the driver no longer has a drive so that the electronic device can be completely turned off.

Figure 2:
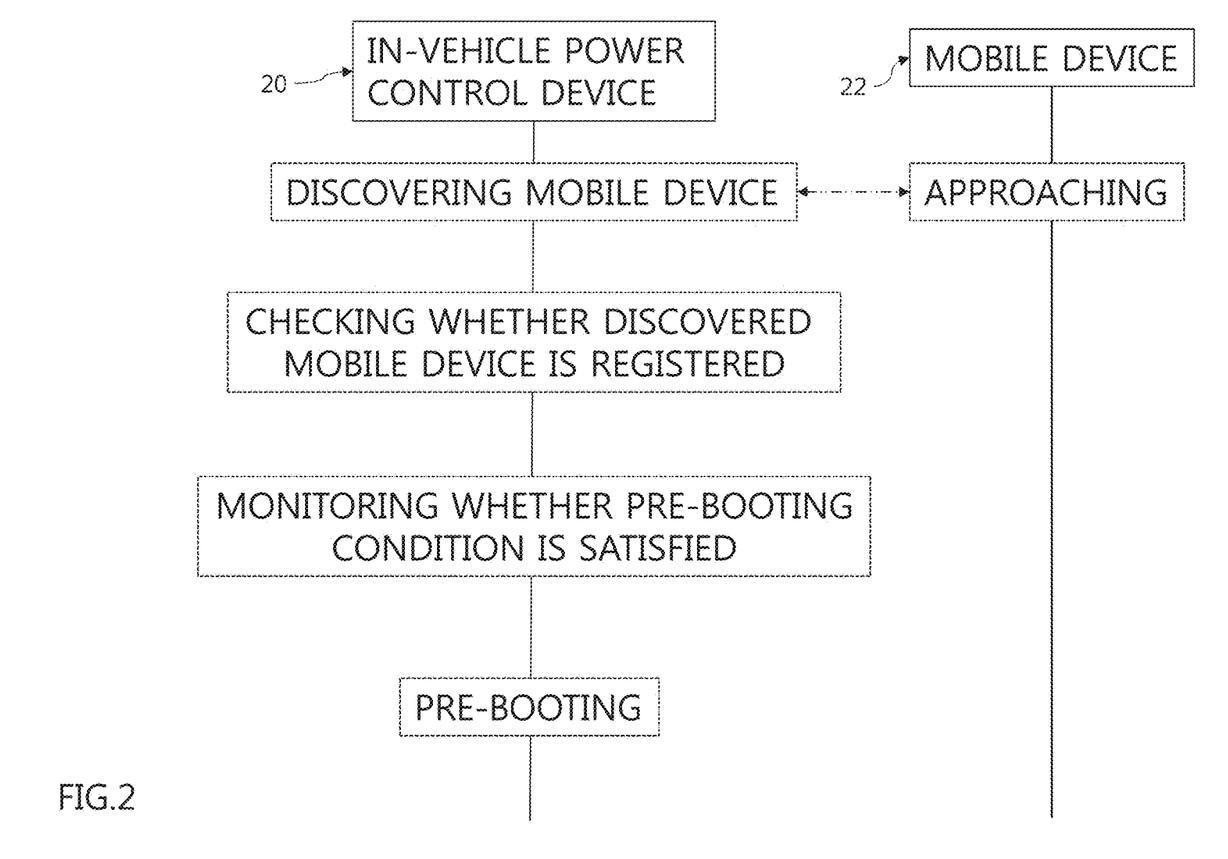
FIG. 2 describes a first power control method of in-vehicle system.

FIG. 2 describes a first power control method of in-vehicle system.

As shown, in the first power control method, an in-vehicle power control device 20 can watch location of a mobile device 22. The in-vehicle power control device 20 is included in the vehicle 10 shown in FIG. 1. The in-vehicle power control device 20 can discover the mobile device 22 locating or moving within a predetermined range from the vehicle 10 via a local communication network. Herein, the mobile device 22 can include a communication module configured to communicate with the in-vehicle power control device 20 via a data communication link under the same local communication network.

If the in-vehicle power control device 20 discovers the mobile device 22, then the in-vehicle power control device 20 checks whether the discovered mobile device is registered. The in-vehicle power control device 20 can include information regarding a mobile device possessed or owned by a driver. If the mobile device discovered by the in-vehicle power control device 20 is not registered previously, the in-vehicle power control device 20 does not need to perform a process for pre-booting because the discovered mobile device does not belong to the driver but belongs to another person such as a pedestrian, or etc.

When the mobile device 22 discovered by the in-vehicle power control device 20 is registered, the in-vehicle power control device 20 can monitor whether the mobile device 22 satisfies a predetermined condition for pre-booting. By the way of example but not limitation, if the mobile device 22 have stayed within a 20 to 30 meter radius from the in-vehicle power control device 20 included in the vehicle over 5 to 15 seconds, the in-vehicle power control device 20 can understand that the driver possessing the mobile device 22 would get in the vehicle soon.

After monitoring location of mobile device 22 to recognize that the mobile device 22 satisfies the condition for pre-booting, the in-vehicle power control device 20 can pre-boot a computing device included in the vehicle.

Figure 3:
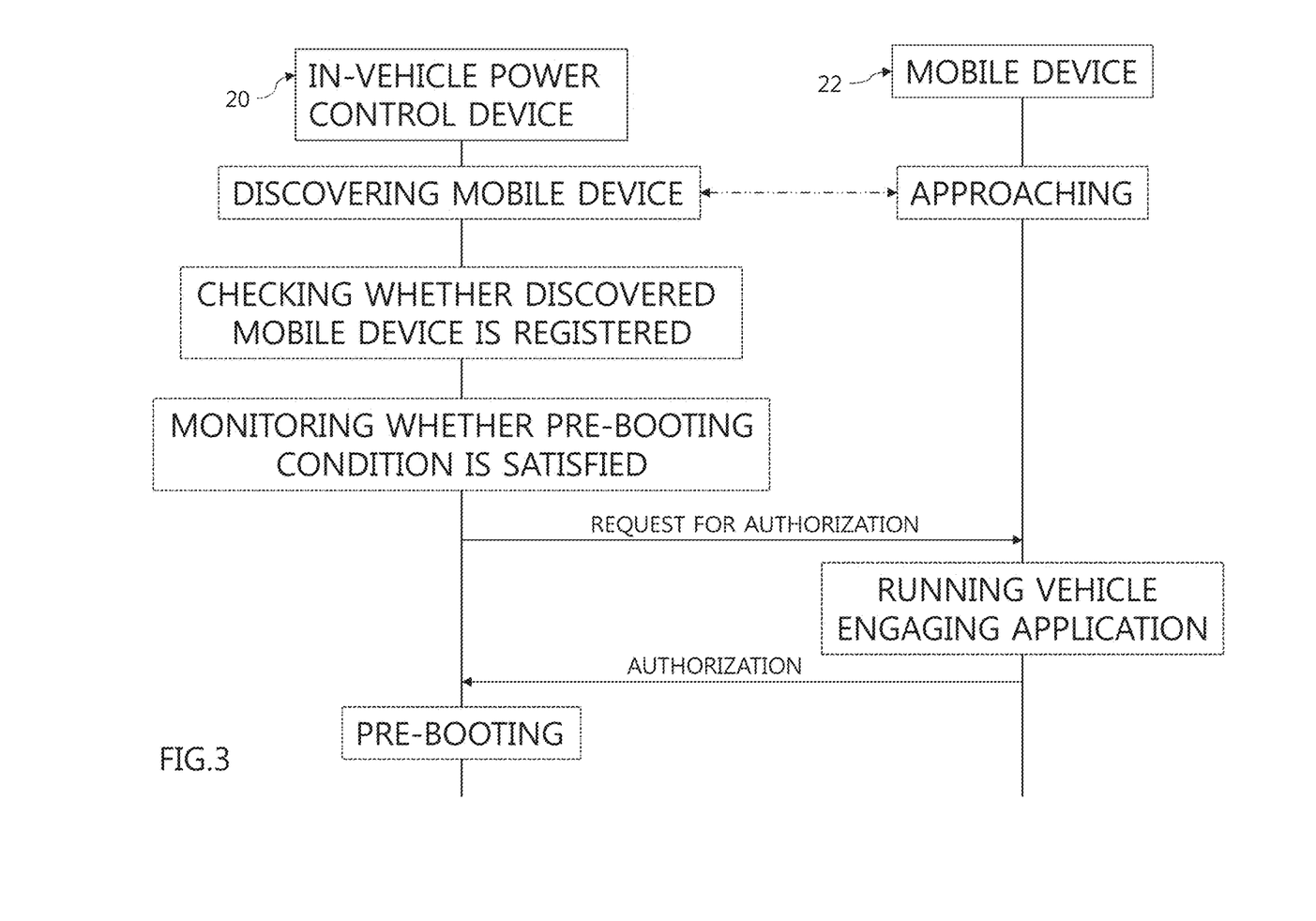
FIG. 3 shows a second power control method of in-vehicle system.

FIG. 3 shows a second power control method of in-vehicle system.

As shown, in the second power control method, an in-vehicle power control device 20 can check the location of a mobile device 22. The vehicle 10 shown in FIG. 1 can include the in-vehicle power control device 20 configured to discover the mobile device 22 within a predetermined range from the vehicle 10 through a local communication network. Herein, the mobile device 22 can include a communication module configured to establish a data communication link with the in-vehicle power control device 20 under the same local communication network.

When the in-vehicle power control device 20 discovers the mobile device 22, the in-vehicle power control device 20 can check whether the discovered mobile device is registered. Herein, the in-vehicle power control device 20 can include information regarding a mobile device possessed or owned by a driver. If the mobile device discovered by the in-vehicle power control device 20 is not registered, the in-vehicle power control device 20 does not need to perform a process for pre-booting because the discovered mobile device does not belong to the driver but belongs to another person such as a pedestrian, or etc.

When the mobile device 22 discovered by the in-vehicle power control device 20 is registered, the in-vehicle power control device 20 can monitor whether the mobile device 22 satisfies a predetermined condition for pre-booting. By the way of example but not limitation, if the mobile device 22 have stayed within a 20 to 30 meter radius from the in-vehicle power control device 20 included in the vehicle over 5 to 15 seconds, the in-vehicle power control device 20 can understand that the driver possessing the mobile device 22 would get in the vehicle soon.

After monitoring the location of the mobile device 22 to recognize that the mobile device 22 satisfies the condition for pre-booting, the in-vehicle power control device 20 can transmit a request signal for power control to the mobile device 22. After receiving the request signal, the mobile device 22 can execute a vehicle engaging application and transfer an authorization signal corresponding to the request signal to the in-vehicle power control device 20.

For example, the vehicle engaging application run at the mobile device 22 can automatically transmit the authorization signal according to a predetermined condition or a particular setting mode set up by a driver. Further, the mobile device receiving the request signal can run the vehicle engaging application, and receive user's input (or driver's confirmation) via input devices included in the mobile device.

The in-vehicle power control device 20 can pre-boot a computing device included in the vehicle after receiving the authorization signal from the mobile device 22.

Figure 4:
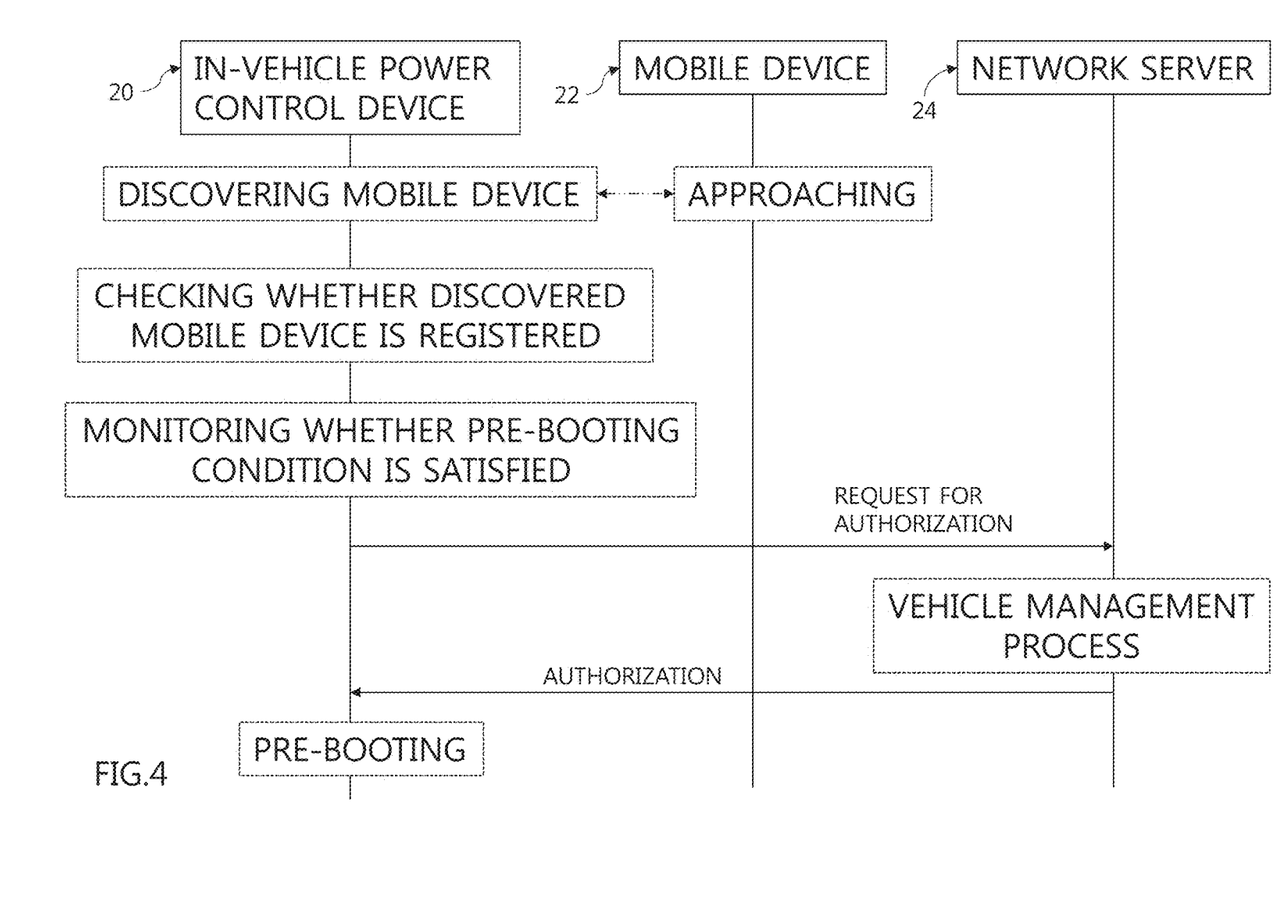
FIG. 4 shows a third power control method of in-vehicle system.

FIG. 4 shows a third power control method of in-vehicle system.

As shown, in the third power control method, an in-vehicle power control device 20 can discover location of a mobile device 22. The in-vehicle power control device 20 is included in the vehicle 10 shown in FIG. 1, and configured to discover the mobile device 22 within a predetermined range from the vehicle 10 by using a local communication network. Herein, the mobile device 22 can include a communication module configured to establish a communication link under the same local communication network.

After the in-vehicle power control device 20 discovers the mobile device 22, the in-vehicle power control device 20 can check whether the discovered mobile device is registered. Herein, the in-vehicle power control device 20 can include information regarding a mobile device possessed or owned by a driver. When the mobile device discovered by the in-vehicle power control device 20 is not registered beforehand, the in-vehicle power control device 20 does not need to perform a process for pre-booting because the discovered mobile device does not belong to the driver but belongs to another person such as a pedestrian, or etc.

When the mobile device 22 discovered by the in-vehicle power control device 20 is registered, the in-vehicle power control device 20 can monitor whether the mobile device 22 satisfies a predetermined condition for pre-booting. By the way of example but not limitation, if the mobile device 22 have stayed within a 20 to 30 meter radius from the in-vehicle power control device 20 included in the vehicle over 5 to 15 seconds, the in-vehicle power control device 20 can understand that the driver possessing the mobile device 22 would get in the vehicle soon.

While monitoring location of mobile device 22, the in-vehicle power control device 20 can recognize that the mobile device 22 satisfies the condition for pre-booting. Then, the in-vehicle power control device 20 can transmit a request signal for power control to the network server 24. After receiving the request signal, the network server 24 can execute a vehicle management process and thereby transfer an authorization signal corresponding to the request signal to the in-vehicle power control device 20.

The network server 24 can provide plural information regarding vehicle operation and management to an owner or a driver through a wireless network and/or a wired network. For example, the network server 24 can be run by a vehicle manufacturer or a vehicle sale organization. Further, the network server 24 can be capable of storing, or tracking, vehicle status or information so as to provide useful services to the driver.

For example, in the network server, the owner or driver can set up pre-booting condition or pre-booting permission for computing devices included in the vehicle. Based on the pre-booting condition or the pre-booting permission, the network server 24 can transmit an authorization signal corresponding to the request signal into the in-vehicle power control device 20.

The in-vehicle power control device 20 receiving the authorization signal from the network server 24 can pre-boot a computing device included in the vehicle.

Figure 5:
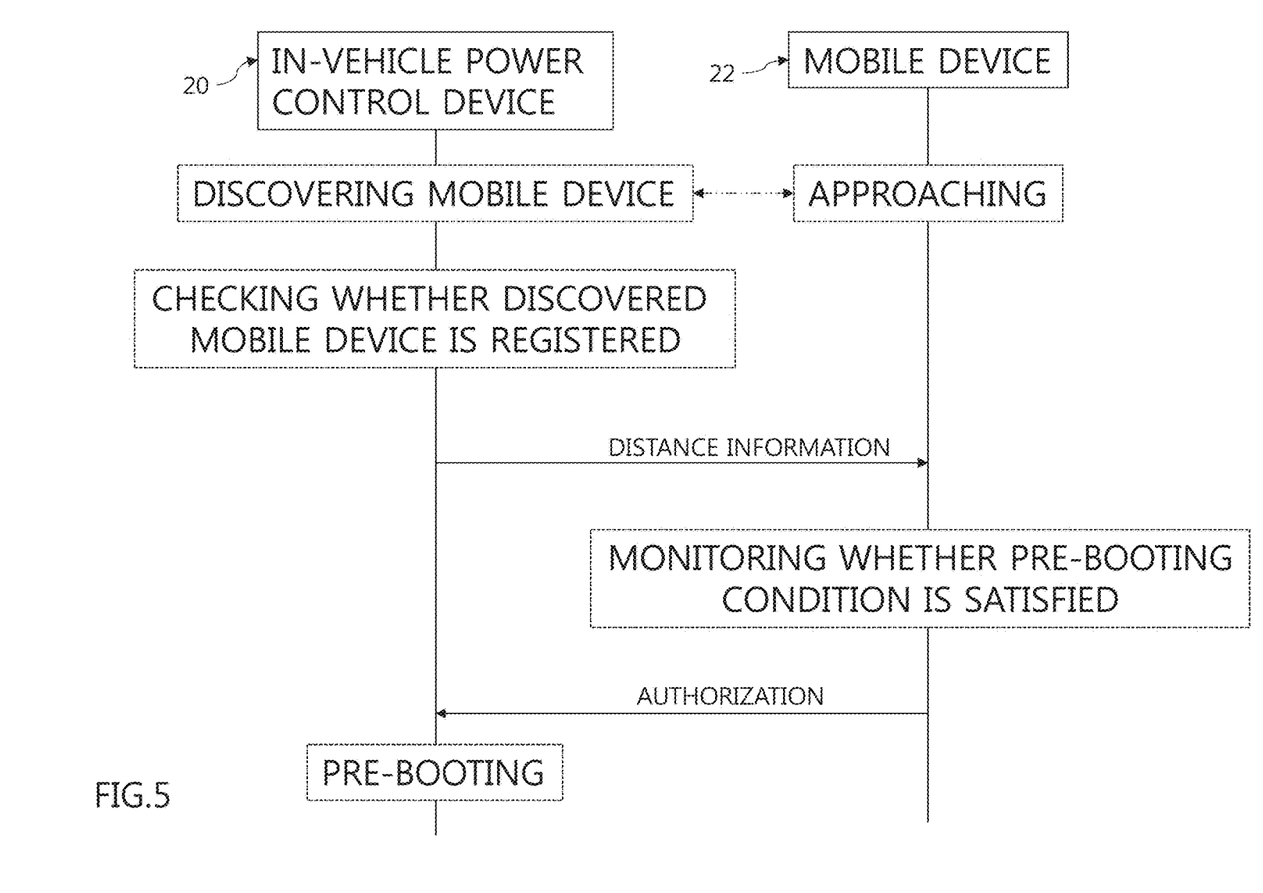
FIG. 5 describes a fourth power control method of in-vehicle system.

FIG. 5 describes a fourth power control method of in-vehicle system.

As shown, in the fourth power control method, an in-vehicle power control device 20 can watch the location of a mobile device 22. The in-vehicle power control device 20 is adapted in the vehicle 10 shown in FIG. 1. The in-vehicle power control device 20 is capable of discovering the mobile device 22 locating or moving within a predetermined range from the vehicle 10 via a local communication network. Similar to the in-vehicle power control device 20, the mobile device 22 can include a communication module configured to engage with the in-vehicle power control device 20 via a data communication link under the same local communication network.

If the in-vehicle power control device 20 discovers the mobile device 22, then the in-vehicle power control device 20 checks whether the discovered mobile device is registered in the past. The in-vehicle power control device 20 can contain registration information regarding a mobile device possessed or owned by a driver. If the mobile device discovered by the in-vehicle power control device 20 is not registered, the in-vehicle power control device 20 does not have to proceed with a process for pre-booting because the discovered mobile device does not belong to the driver but belongs to another person such as a pedestrian, or etc.

If the mobile device 22 discovered by the in-vehicle power control device 20 is registered, the in-vehicle power control device 20 can transmit, to the mobile device 22, estimated information about a distance between the in-vehicle power control device 20 and the mobile device 22. By the way of example but not limitation, the estimated information can be delivered periodically into the mobile device 22.

The mobile device 22, receiving the estimated information regarding a distance from the in-vehicle power control device 20, can determine by itself whether the mobile device 22 satisfies a predetermined condition for pre-booting. By the way of example but not limitation, if it is confirmed that the mobile device 22 is within a 20 to 30 meter radius from the in-vehicle power control device 20 included in the vehicle over 5 to 15 seconds, the mobile device 22 can determine that the predetermined condition for pre-booting is met. When the predetermined condition for pre-booting is satisfied, the mobile device 22 can transmit an authorization signal for pre-booting into the in-vehicle power control device 20.

Further, the mobile device 22 can either receive the predetermined condition for pre-booting from the in-vehicle power control device 20, or store user's setup information regarding the predetermined condition for pre-booting in a memory.

After receiving the authorization signal from the mobile device 22, the in-vehicle power control device 20 can pre-boot a computing device included in the vehicle.

For example, the mobile device 22 can include an vehicle engaging application (e.g., an application program) executed by a processing system that comprises at least one data processor and at least one computer-readable memory, in order to remotely control a power supplied to an in-vehicle computing device. The vehicle engaging application can be stored in computer-readable mediums.

As above described, the method for remotely controlling a supplied power in vehicle can include steps of activating an application in response to delivered information that the mobile device 22 is discovered by a vehicle, receiving a distance information and a pre-booting condition from the vehicle, and monitoring whether the pre-booting condition is met. If the pre-booting condition is met, an authorization signal can be transmitted. Further, the authorization signal can be transmitted after a user's input or confirmation.

Figure 6:
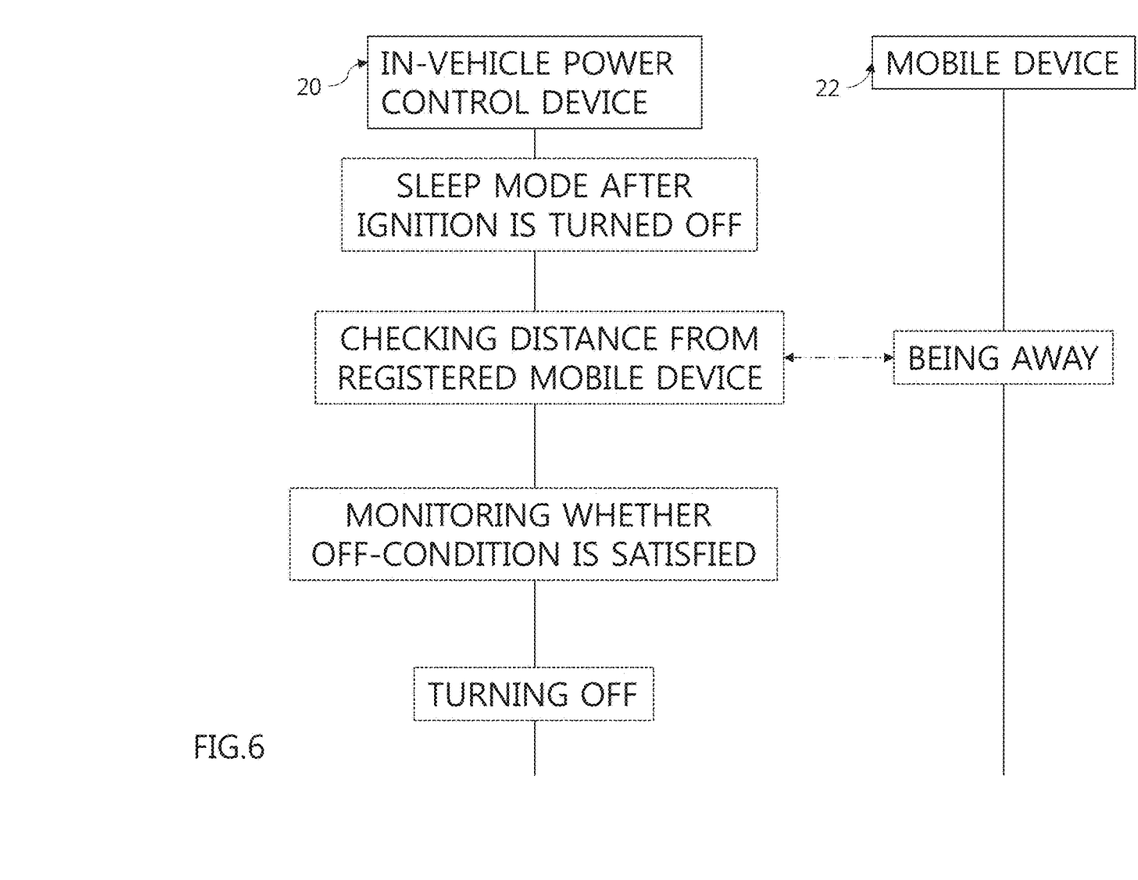
FIG. 6 shows a fifth power control method of in-vehicle system.

FIG. 6 shows a fifth power control method of in-vehicle system.

As shown, in the fifth power control method, an in-vehicle power control device 20 can discover location of a mobile device 22. The in-vehicle power control device 20 can be included in the vehicle 10 shown in FIG. 1. The in-vehicle power control device 20 can discover the mobile device 22 within a predetermined range from the vehicle 10 by using a local communication network. Also, the mobile device 22 can include a communication module configured to establish a communication link under the same local communication network.

When a driver turns off the ignition of the vehicle 10, computing devices or electronic devices included in the vehicle 10 can operate in a sleep mode. Herein, the sleep mode is a kind of a power saving mode, different from a completely turned-off state.

While the computing devices or electronic devices operate in the sleep mode, the in-vehicle power control device 20 can watch the mobile device 22 possessed by the driver. Since the mobile device 22 possessed by the driver can have been communicating with the in-vehicle power control device 20 before the ignition is turned off, it may not be required to check whether the mobile device 22 is registered.

While the computing devices or electronic devices operate in the sleep mode, the in-vehicle power control device 20 can monitor whether a predetermined condition for completely turning off the computing devices or electronic devices is satisfied. For example, when the mobile device 22 has been a predetermined distance away from the in-vehicle power control device 20 during a predetermined time, the in-vehicle power control device 20 can completely turn off the computing devices or electronic devices included in the vehicle 10. For the way of example but not limitation, when the mobile device 12 is 20 to 30 meters away from the in-vehicle power control device 20 and does not re-enter within a 20 to 30 meter radius over 5 to 15 seconds, the in-vehicle power control device 20 can understand that the driver having the mobile device 22 no longer has a drive so that the electronic devices can be completely turned off.

As a result of monitoring the mobile device 22, if the predetermined condition for completely turning off the computing devices or electronic devices is satisfied, the in-vehicle power control device 20 can completely turn off the computing devices or electronic devices included in the vehicle 10.

Figure 7:
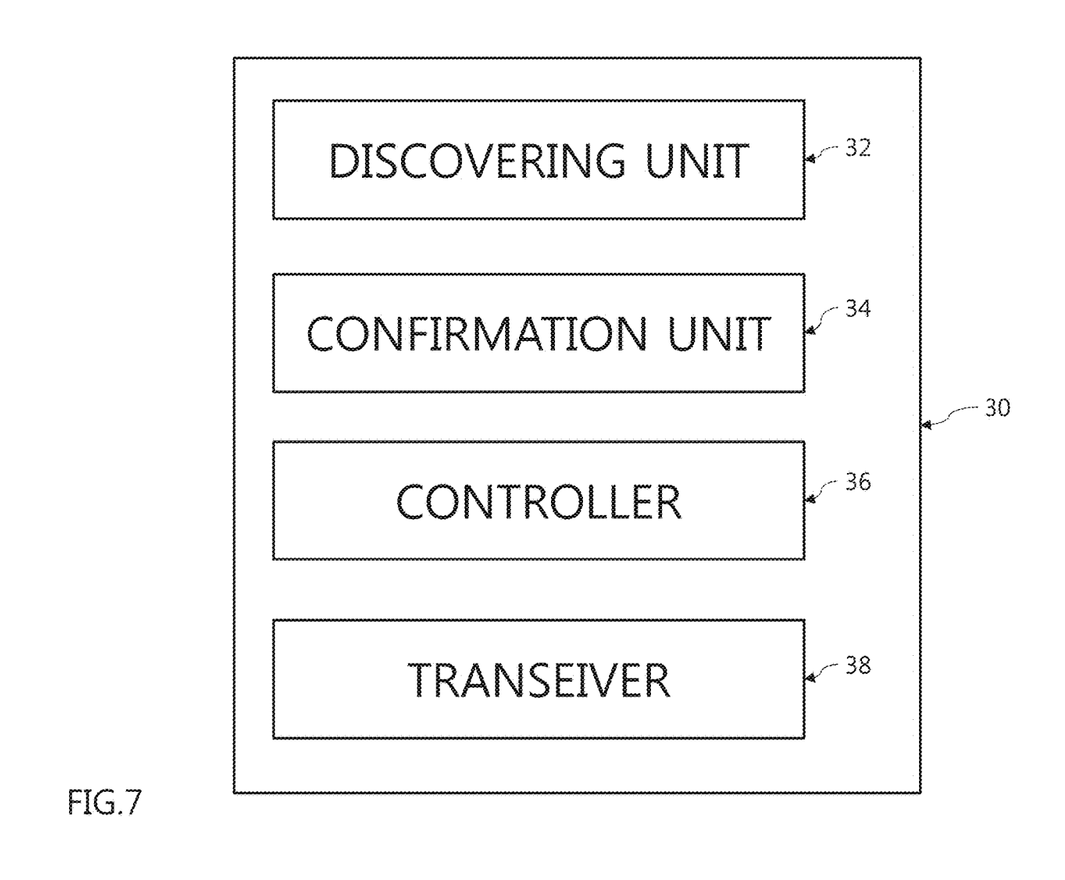
FIG. 7 describes an in-vehicle power control apparatus.

FIG. 7 describes an in-vehicle power control apparatus.

As shown, the in-vehicle power control apparatus 30, which can be engaged with at least one of a mobile device and a network server, can include at least one of a discovering unit 32, a confirmation unit 34, and a controller 36. The discovering unit 32 can discover a mobile device which is capable of data communication via a local area network. The confirmation unit 34 can check whether a discovered mobile device is registered. The controller 36 can pre-boot an in-vehicle computing device according to a first condition when the discovered mobile device is registered.

The local area network used by the discovering unit 32 is based on at least one of a Bluetooth, a Bluetooth Low Energy, a ZigBee, an Ultra-Wide Band (UWB), a millimeter wave (mmWave), and the like.

Herein, the first condition can include that the discovered mobile device stays within a predetermined range for a predetermined time. For the way of example but not limitation, the predetermined range is 20 to 30 meters, while the predetermined time is 5 to 15 seconds.

For example, the controller 36 can check whether the discovered mobile device satisfies the first condition. Then, if the first condition is met, the controller 36 can pre-boot the in-vehicle computing device.

Further, the in-vehicle power control apparatus 30 can include a transceiver 38 configured to transmit an authorization request to the discovered mobile device. The transceiver 38 can receive an authorization signal corresponding to the first condition, which is delivered from the discovered mobile device. The transceiver 38 can use the local area network used by the discovering unit 32 as well as an internet technology such as a Wi-Fi, or etc., so as to transmit the authorization request and receive the authorization signal. If the authorization signal corresponding to the first condition is delivered via the transceiver 38, the controller 36 can pre-boot the in-vehicle computing device.

Further, the transceiver 38 can transmit the authorization request to at least one of the discovered mobile device and the network server, and receive the authorization signal corresponding to the authorization request.

For example, the confirmation unit 34 can check whether the discovered mobile device meets the first condition. If the condition is satisfied, the authorization request is transmitted by the transceiver 38. If the authorization signal is delivered via the transceiver 38, the controller 36 can pre-boot the in-vehicle computing device.

Further, the confirmation unit 34 can check whether the discovered mobile device satisfies a second condition after an ignition is turned off. If the second condition is met, the controller 36 can turn off the in-vehicle computing device. Herein, the second condition includes that the discovered mobile device is out of a predetermined range for a predetermined time. For the way of example but not limitation, the predetermined range can be any one of 20 to 30 meters, while the predetermined time can be any one of 5 to 15 seconds.

As above described, pre-booting for electronic devices in a vehicle can be controlled when a local area network technique such as a Bluetooth, which is used limited to handsfree, media play, media streaming, phonebook, etc., is utilized for determining a driver's location through communicating with driver's mobile device.

Further, since the vehicle can selectively use the local area network technique which consumes less power for watching driver's location, limited capability of vehicle battery can be redeemed.

Further, when the vehicle is engaged with a network server, a vehicle security can be protected by a real-time control if pre-booting electronic devices is allowed by driver's setup or configuration.

The aforementioned forms are achieved by combination of structural elements and features of the disclosure in a predetermined manner. Each of the structural elements or features should be considered selectively unless specified separately. Each of the structural elements or features may be carried out without being combined with other structural elements or features. Also, some structural elements and/or features may be combined with one another to constitute the forms of the disclosure. The order of operations described in the forms of the disclosure may be changed. Some structural elements or features of one form may be included in another form, or may be replaced with corresponding structural elements or features of another form. Moreover, it will be apparent that some claims referring to specific claims may be combined with another claims referring to the other claims other than the specific claims to constitute the form or add new claims by means of amendment after the application is filed.

Various forms may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet).

It will be apparent to those skilled in the art that various modifications and variations can be made in the disclosure without departing from the spirit or scope of the disclosures. Thus, it is intended that the disclosure covers the modifications and variations of this disclosure provided they come within the scope of the appended claims and their equivalents.

What is claimed is:

1. A method for controlling a power supplied to an in-vehicle computing device of a vehicle, comprising:
discovering, by a discovering unit, a mobile device communicating with the discovering unit via a local area network by:
detecting a signal strength of the mobile device with respect to the discovering unit according to the local area network; and
determining the mobile device is a discovered mobile device when the detected signal strength corresponds to a distance within a predetermined range from the vehicle;
determining, by an in-vehicle power control device, whether the discovered mobile device is registered with the vehicle;
when the discovered mobile device is determined to be registered, pre-booting the in-vehicle computing device based on a first condition that comprises determining the mobile device remains within the predetermined range from the vehicle for a predetermined length of time; and
subsequent to pre-booting the in-vehicle computing device, authorizing access to the mobile device by establishing a data communication link;
wherein pre-booting the in-vehicle computing device comprises:
transmitting a request signal to the discovered mobile device; and
pre-booting the in-vehicle computing device when an authorization by a user command inputted via an application activated in response to the request signal is received.

2. The method according to claim 1, wherein the local area network is based on at least one of a Bluetooth, a Bluetooth Low Energy, a ZigBee, an Ultra-Wide Band (UWB), or a millimeter wave (mmWave).

3. The method according to claim 1, further comprising:
after an ignition of the vehicle is turned off, determining whether the discovered mobile device satisfies a second condition; and
when the second condition is met, turning off the in-vehicle computing device.

4. The method according to claim 3, wherein the second condition includes that the discovered mobile device is out of a predetermined range from the vehicle for a predetermined time.

5. The method according to claim 1, wherein the pre-booting the in-vehicle computing device comprises:
determining whether the discovered mobile device satisfies the first condition; and
when the first condition is met, pre-booting the in-vehicle computing device.

6. An apparatus for controlling a power supplied to an in-vehicle computing device of a vehicle, comprising:
a discovering unit configured to:
detect a signal strength of a mobile device communicating with the discovering unit via a local area network; and
determine the mobile device is a discovered mobile device when the detected signal strength corresponds to a distance within a predetermined range from the vehicle;
a confirmation unit configured to:
determine whether the discovered mobile device is registered with the vehicle;
a controller configured to:
pre-boot the in-vehicle computing device based on a first condition when the discovered mobile device is determined to be registered, wherein the first condition comprises determining the mobile device remains within the predetermined range from the vehicle for a predetermined length of time; and
subsequent to pre-booting the in-vehicle computing device, authorize access to the mobile device to establish a data communication link;
a transceiver configured to:
transmit a request signal for vehicle control into the discovered mobile device; and
receive an authorization signal generated by a user command inputted via an application activated in response to the request signal;
wherein the controller is further configured to pre-boot the in-vehicle computing device in response to the authorization signal received from the discovered mobile device.

7. The apparatus according to claim 6, wherein the local area network is based on at least one of a Bluetooth, a Bluetooth Low Energy, a ZigBee, an Ultra-Wide Band (UWB), or a millimeter wave (mmWave).

8. The apparatus according to claim 6, wherein the confirmation unit determines whether the discovered mobile device satisfies a second condition after an ignition of the vehicle is turned off, and
wherein the controller is configured to turn off the in-vehicle computing device when the second condition is met.

9. The apparatus according to claim 8, wherein the second condition includes that the discovered mobile device is out of a predetermined range from the vehicle for a predetermined time.

10. The apparatus according to claim 6, wherein the confirmation unit determines whether the discovered mobile device satisfies the first condition, and
wherein the controller is configured to pre-boot the in-vehicle computing device when the first condition is met.

* * * * *

UNITED STATES PATENT AND TRADEMARK OFFICE
CERTIFICATE OF CORRECTION

Page 1 of 1

PATENT NO. : 10,318,313 B2
APPLICATION NO. : 15/066079
DATED : June 11, 2019
INVENTOR(S) : Un Hwan Sol It is certified that error appears in the above-identified patent and that said Letters Patent is hereby corrected as shown below:

On the Title Page

Item (73), Please delete "Hyundai Moto Company"
And replace with --HYUNDAI MOTOR COMPANY--

Signed and Sealed this
Sixth Day of April, 2021

Drew Hirshfeld
*Performing the Functions and Duties of the
Under Secretary of Commerce for Intellectual Property and
Director of the United States Patent and Trademark Office*